(12) United States Patent
Li et al.

(10) Patent No.: US 10,969,617 B2
(45) Date of Patent: Apr. 6, 2021

(54) DISPLAY PANEL WITH LIGHT-SHIELDING PATTERNS, DISPLAY DEVICE AND DISPLAY METHOD

(71) Applicant: BOE TECHNOLOGY GROUP CO., LTD., Beijing (CN)

(72) Inventors: Zhongxiao Li, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 38 days.

(21) Appl. No.: 16/029,295

(22) Filed: Jul. 6, 2018

(65) Prior Publication Data

US 2019/0179197 A1   Jun. 13, 2019

(30) Foreign Application Priority Data

Dec. 8, 2017 (CN) .......................... 201711294562.1

(51) Int. Cl.
*G09G 3/36* (2006.01)
*G02F 1/1335* (2006.01)

(52) U.S. Cl.
CPC .. *G02F 1/133512* (2013.01); *G02F 1/133528* (2013.01); *G09G 3/3611* (2013.01); *G02F 1/133531* (2021.01); *G09G 2300/023* (2013.01); *G09G 2300/0439* (2013.01); *G09G 2310/0221* (2013.01); *G09G 2320/028* (2013.01)

(58) Field of Classification Search
CPC .. G02F 2001/133531; G09G 2300/023; G09G 2300/0439; G09G 2310/0221; G09G 2320/028; G09G 3/3611
See application file for complete search history.

(56) References Cited

U.S. PATENT DOCUMENTS

| 2004/0218245 | A1* | 11/2004 | Kean | G02B 30/27 359/232 |
|---|---|---|---|---|
| 2009/0058845 | A1* | 3/2009 | Fukuda | B60K 35/00 345/214 |
| 2011/0157171 | A1* | 6/2011 | Lin | H04N 13/315 345/419 |
| 2011/0221655 | A1 | 9/2011 | Fukui | |
| 2013/0155034 | A1* | 6/2013 | Nakayama | G09F 9/35 345/204 |

(Continued)

FOREIGN PATENT DOCUMENTS

| CN | 102222492 B | 5/2013 |
|---|---|---|
| CN | 103163683 A | 6/2013 |

(Continued)

OTHER PUBLICATIONS

First Office Action for Chinese Application No. 201711294562.1, dated Dec. 25, 2019, 9 pages.

(Continued)

*Primary Examiner* — Ram A Mistry

(74) *Attorney, Agent, or Firm* — Brooks Kushman P.C.

(57) ABSTRACT

A display panel, a display device and a display method are provided. The display panel includes: first pixels configured to display a first image; second pixels configured to display a second image. The display panel further includes light-shielding patterns configured to shield part of light beams emitted by the second pixels.

20 Claims, 2 Drawing Sheets

(56) References Cited

U.S. PATENT DOCUMENTS

| | | | |
|---|---|---|---|
| 2015/0042921 A1* | 2/2015 | Kim | G02F 1/13363 |
| | | | 349/61 |
| 2016/0011450 A1 | 1/2016 | Li et al. | |
| 2016/0033778 A1* | 2/2016 | Lin | G02B 30/27 |
| | | | 359/462 |
| 2016/0282644 A1 | 9/2016 | Lin et al. | |

FOREIGN PATENT DOCUMENTS

| | | |
|---|---|---|
| CN | 104090417 A | 10/2014 |
| CN | 104122705 A | 10/2014 |
| CN | 205844670 U | 12/2016 |
| CN | 107247361 A | 10/2017 |

OTHER PUBLICATIONS

Second Office Action for Chinese Application No. 201711294562.1, dated Jun. 10, 2020, 9 Pages.

* cited by examiner

US 10,969,617 B2

DISPLAY PANEL WITH LIGHT-SHIELDING PATTERNS, DISPLAY DEVICE AND DISPLAY METHOD

CROSS-REFERENCE TO RELATED APPLICATION

This application claims priority to Chinese Patent Application No. 201711294562.1 filed on Dec. 8, 2017, which is incorporated herein by reference in its entirety.

TECHNICAL FIELD

The present disclosure relates to the field of touch technology, in particular to a display panel, a display device and a display method.

BACKGROUND

With the development of display technology, display devices have become indispensable products for everyone, such as mobile phones, notebook computers, personal digital assistants, and the like. When using the display device, how to ensure that the display content of the display device is not viewed by the other users is a matter of concern.

The anti-peeping display device in the related art need to be provided with an anti-peeping functional layer which is a multi-layer structure, which leads to a complex and heavy structure of the display device and puts forward higher requirements for the manufacturing process.

In view of this, a new anti-peeping scheme is urgently needed to solve the above technical issues.

SUMMARY

A display panel is provided in the present disclosure, including a plurality of pixels, where the pixels include: first pixels configured to display a first image; second pixels configured to display a second image; where the display panel further includes light-shielding patterns configured to shield part of light beams emitted by the second pixels.

Optionally, the light-shielding patterns include a first light-shielding sub pattern and a second light-shielding sub pattern arranged at different layers, the second light-shielding sub pattern includes a slit, and an orthographic projection of the slit onto the first light-shielding sub pattern at least partially overlaps the first light-shielding sub pattern.

Optionally, the orthographic projection of the slit onto the first light-shielding sub pattern is within the first light-shielding sub pattern.

Optionally, the display panel further includes: an upper substrate and a lower substrate opposite to each other, where the first light-shielding sub pattern is on the upper substrate, and the second light-shielding sub pattern is on the lower substrate.

Optionally, a width of the first light-shielding sub pattern is: $b = a + 2 \times \tan\theta \times h$, where a is a width of the slit, h is a vertical interval between the first light-shielding sub pattern and the second light-shielding sub pattern, b is the width of the first light-shielding sub pattern, $\theta$ is an angle, where $\eta_1 \times \sin\theta = \eta_2 \times \sin\Phi$, $\Phi$ is a privacy angle, $\theta_1$ is a refractive index of a medium in a cell of the display panel, and $\theta_2$ is a refractive index of air.

Optionally, the display panel further includes: a liquid crystal layer between the upper substrate and the lower substrate; an upper polarizer at a side of the upper substrate away from the lower substrate; and a lower polarizer at a side of the lower substrate away from the upper substrate; where an optical transmission axis of the upper polarizer is perpendicular to an optical transmission axis of the lower polarizer, and an initial orientation of liquid crystal molecules of the liquid crystal layer corresponding to the second pixels is parallel to the optical transmission axis of the upper polarizer.

Optionally, the display panel further includes: a liquid crystal layer between the upper substrate and the lower substrate; an upper polarizer at a side of the upper substrate away from the lower substrate; and a lower polarizer at a side of the lower substrate away from the upper substrate; where an optical transmission axis of the upper polarizer is perpendicular to an optical transmission axis of the lower polarizer, and an initial orientation of liquid crystal molecules of the liquid crystal layer corresponding to the second pixels is parallel to the optical transmission axis of the lower polarizer.

Optionally, the first pixels and the second pixels are arranged alternately.

A display device is further provided in the present disclosure, including: the above display panel, a first driver, configured to apply a first driving signal to the first pixels, to enable the first pixels to display a first image; and a second driver, configured to apply a second driving signal to the second pixels, to enable the second pixels to display a second image.

Optionally, the first image is a normal image, and the second image is an interference image.

Optionally, the first image and the second image together forms a normal image.

Optionally, the light-shielding patterns include a first light-shielding sub pattern and a second light-shielding sub pattern arranged at different layers, the second light-shielding sub pattern includes a slit, and an orthographic projection of the slit onto the first light-shielding sub pattern at least partially overlaps the first light-shielding sub pattern.

Optionally, the orthographic projection of the slit onto the first light-shielding sub pattern is within the first light-shielding sub pattern.

Optionally, a width of the first light-shielding sub pattern is: $b = a + 2 \times \tan\theta \times h$, where a is a width of the slit, h is a vertical interval between the first light-shielding sub pattern and the second light-shielding sub pattern, b is the width of the first light-shielding sub pattern, $\theta$ is an angle, where $\eta_1 \times \sin\theta = \eta_2 \times \sin\Phi$, $\Phi$ is a privacy angle, $\eta_1$ is a refractive index of a medium in a cell of the display panel, and $\eta_2$ is a refractive index of air.

A display method of a display device is further provided in the present disclosure, where display device includes the above display panel, the display method includes: applying a first driving signal to the first pixels, to enable the first pixels to display a first image; applying a second driving signal to the second pixels, to enable the second pixels to display a second image.

Optionally, the first image is a normal image, and the second image is an interference image.

Optionally, the first image and the second image together forms a normal image.

Optionally, the light-shielding patterns include a first light-shielding sub pattern and a second light-shielding sub pattern arranged at different layers, the second light-shielding sub pattern includes a slit, and an orthographic projection of the slit onto the first light-shielding sub pattern at least partially overlaps the first light-shielding sub pattern.

Optionally, the orthographic projection of the slit onto the first light-shielding sub pattern is within the first light-shielding sub pattern.

Optionally, a width of the first light-shielding sub pattern is: $b=a+2\times\tan\theta\times h$, where a is a width of the slit, h is a vertical interval between the first light-shielding sub pattern and the second light-shielding sub pattern, b is the width of the first light-shielding sub pattern, θ is an angle, where $\eta_1\times\sin\theta=\eta_2\times\sin\Phi$, Φ is a privacy angle, $\eta_1$ is a refractive index of a medium in a cell of the display panel, and $\eta_2$ is a refractive index of air.

DETAILED DESCRIPTION

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, it should be understood that the size of the serial numbers of the following processes does not mean the order of the execution order, and the order of execution of each process should be determined by its function and internal logic, rather than limiting the embodiments of the present disclosure.

The present disclosure provides a solution to solve the technical issue that the display device in the related art with an anti-peeping function has a complex structure and requires a relatively high standard of manufacturing process.

Figure 1:
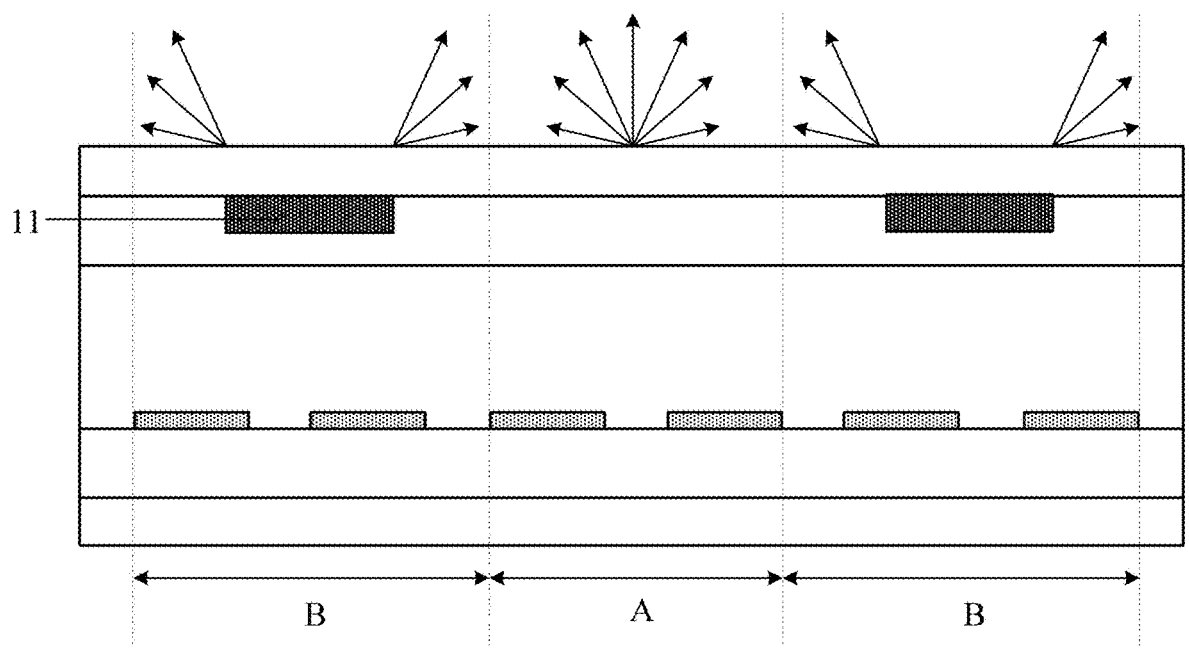
FIG. 1 is a schematic view of a display panel in some embodiments of the present disclosure.

A display panel is provided in some embodiments of the present disclosure. As shown in FIG. 1, the display panel includes: first pixels A configured to display a first image; second pixels B configured to display a second image. The display panel further includes light-shielding patterns 11 configured to shield part of light beams emitted by the second pixels B.

The display panel in some embodiments of the present disclosure is configured with two pixels of different display contents, so as to implement an anti-peeping display.

In some embodiments of the present disclosure, the first image displayed by the first pixels is served as a normal display image of the display panel, and the second image displayed by the second pixels interferes with the normal display image. The light-shielding patterns shield part of light beams emitted by the second pixels, so the region corresponding to the shielded angle is not interfered by the interference image, and the user may only see the normal display image in the display blind zone of the second pixels, so as to achieve the anti-peeping function.

In some embodiments of the present disclosure, the first image displayed by the first pixels and the second image displayed by the second pixels together forms the normal image, and the display blind zone of the second pixels which is shielded is not able to display the normal image completely, so the display blind zone become the anti-peeping region.

Compared with the related art, two different pixels configured to display different images are provided in the embodiments of the present disclosure, without arranging the optical function layer with the anti-peeping function, thereby simplifying the structure and the manufacturing process, which is beneficial to the product implementation.

The display panel in some embodiments of the present disclosure will be described hereinafter in detail in conjunction with practical applications.

Figure 2:
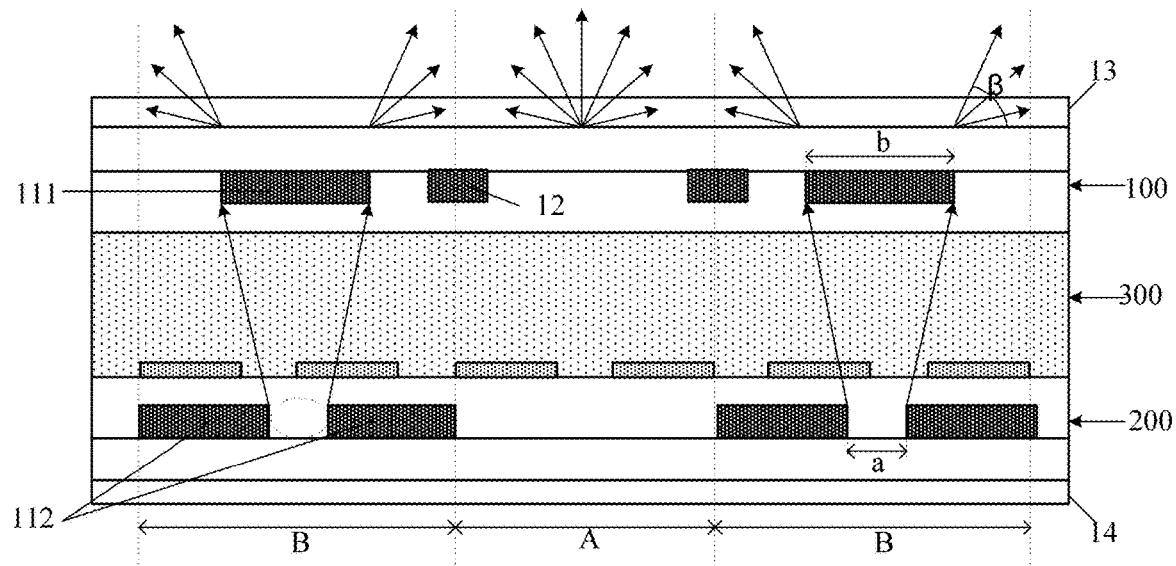
FIG. 2 is a schematic view of a display panel in some embodiments of the present disclosure.

As shown in FIG. 2, the light-shielding patterns 11 in some embodiments of the present disclosure include a first light-shielding sub pattern 111 and a second light-shielding sub pattern 112 arranged at different layers, the second light-shielding sub pattern 112 includes a slit (the oval dotted line in FIG. 2), and an orthographic projection of the slit onto the first light-shielding sub pattern 111 at least partially overlaps the first light-shielding sub pattern 111.

Based on the above design, the slit of the second light-shielding sub pattern 112 is able to limit the incident light of the backlight under the display panel for the second pixels B, and after the cooperation with the first light-shielding sub pattern 111, part of the light beams emitted by the second pixel B may be blocked.

Furthermore, as shown in FIG. 2, in some embodiments of the present disclosure, the orthographic projection of the slit of the second light-shielding sub pattern 112 onto the first light-shielding sub pattern 111 is within the first light-shielding sub pattern 111, so the light beams emitted by the second pixels B in a direction perpendicular to a light-emitting surface of the display panel may be shielded.

In some embodiments of the present disclosure, the display panel further includes an upper substrate 100 and a lower substrate 200 opposite to each other. The first light-shielding sub pattern 111 is on the upper substrate, and the second light-shielding sub pattern 112 is on the lower substrate.

In the related art, a black matrix pattern 12 is arranged on the upper substrate 100, so the first light-shielding sub pattern 111 in the embodiments of the present disclosure may be formed by the manufacturing process of the black matrix pattern 12, so that the first light-shielding sub pattern 111 and the black matrix 12 of the upper substrate 100 may be formed by the same material layer through an etching process, thereby simplifying the manufacturing process of the display panel.

In practical applications, it is able to adjust the shielding of the light beams emitted by the second pixel B by adjusting the width of the first light-shielding sub pattern.

A width of the first light-shielding sub pattern is: $b=a+2\times\tan\theta\times h$, where a is a width of the slit, h is a vertical interval between the first light-shielding sub pattern and the second light-shielding sub pattern, b is the width of the first light-shielding sub pattern, θ is an angle, where $\eta_1\times\sin\theta=\eta_n\times\sin\Phi$, Φ is a privacy angle, $\eta_1$ is a refractive index of a medium in a cell of the display panel, and $\eta_2$ is a refractive index of air.

Based on the above formulae, by adjusting the width b of the first light-shielding sub pattern, the visual angle β of the second pixels B may be flexibly adjusted.

In some embodiments of the present disclosure, the display panel further includes: a liquid crystal layer 300 between the upper substrate 100 and the lower substrate 200;

an upper polarizer 13 at a side of the upper substrate 100 away from the lower substrate 200; and a lower polarizer 14 at a side of the lower substrate 200 away from the upper substrate 100; where an optical transmission axis of the upper polarizer 13 is perpendicular to an optical transmission axis of the lower polarizer 14, and an initial orientation of liquid crystal molecules of the liquid crystal layer 300 corresponding to the second pixels B is parallel to the optical transmission axis of the upper polarizer 13 or the optical transmission axis of the lower polarizer 14.

Based on the above design, it is assumed that the first image displayed by the first pixels A is a normal image and the second image displayed by the second pixels B is an interference image. When the display panel does not require the anti-peeping, the second pixels B are not applied with a driving signal to display the interference image, so that the molecules of the liquid crystal layer corresponding to the second pixel B area are in an initially orientation, which may block the light beams emitted by the backlight source below the display panel, so that the area of the second pixels B is black. Because the pixels are tiny structures in the display screen, it is difficult for the user to see the black pixels.

In some embodiments of the present disclosure, the first pixels A and the second pixels B are arranged alternately, so the display image may be uniform and fine. For example, the pixel may be arranged in an array form, and in each row of the array, the first pixels A and the second pixels B are alternately arranged. In each column of the array, the first pixels A and the second pixels B are also alternately arranged. In some embodiments of the present disclosure, in each row of the array, the number of the first pixels A is different from that of the second pixels B, and the pixels with a smaller number are interspersed among the pixels with a larger number. Similarly, in each column of the array, the number of the first pixels A is different from that of the second pixels B, and the pixels with a smaller number are interspersed among the pixels with a larger number.

Figure 3:
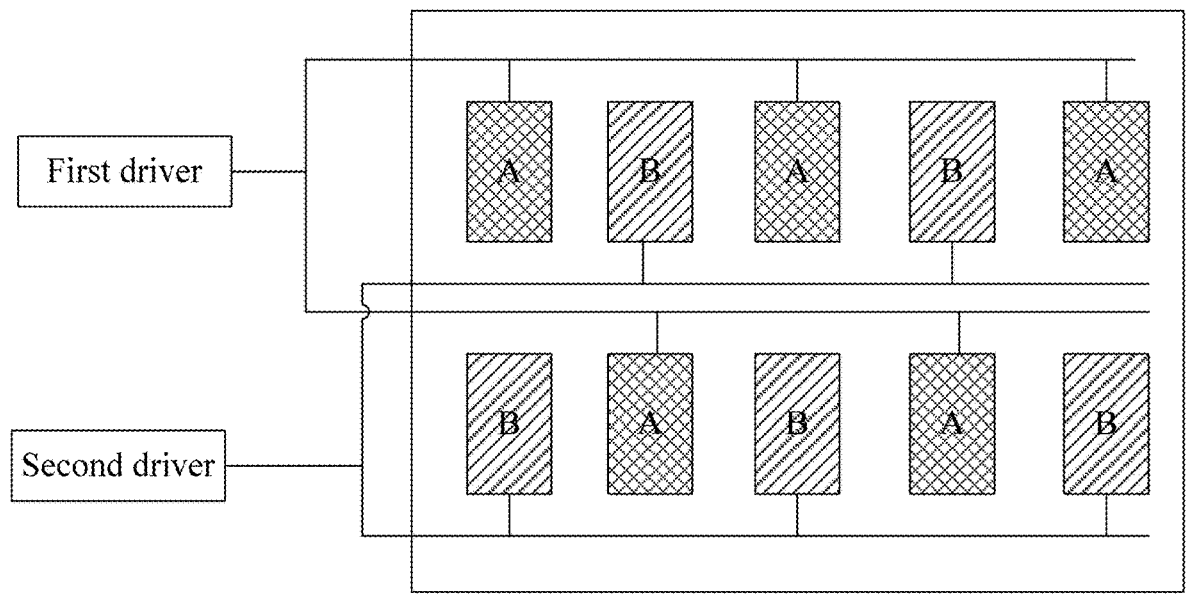
FIG. 3 is a schematic view of a display device in some embodiments of the present disclosure.

In addition, a display device is further provided in some embodiments of the present disclosure. As shown in FIG. 3, the display device includes the above display panel with the first pixels A and the second pixels B.

In some embodiments of the present disclosure, the display device further includes: a first driver, configured to apply a first driving signal to the first pixels A, to enable the first pixels A to display a first image; and a second driver, configured to apply a second driving signal to the second pixels B, to enable the second pixels B to display a second image.

The display panel in some embodiments of the present disclosure is configured with two pixels of different display contents, so as to implement an anti-peeping display.

In some embodiments of the present disclosure, the first image displayed by the first pixels is served as a normal display image of the display panel, and the second image displayed by the second pixels interferes with the normal display image. The light-shielding patterns shield part of light beams emitted by the second pixels, so the region corresponding to the shielded angle is not interfered by the interference image, and the user may only see the normal display image in the display blind zone of the second pixels, so as to achieve the anti-peeping function.

In some embodiments of the present disclosure, the first image displayed by the first pixels and the second image displayed by the second pixels together forms the normal image, and the display blind zone of the second pixels which is shielded is not able to display the normal image completely, so the display blind zone become the anti-peeping region.

Tasking that the display device includes the display panel shown in FIG. 2 as an example. In practical applications, it is assumed that the first pixel is a normal pixel and displays a normal image, and the second pixel is an interference pixel and displays an interference image. Assuming that the voltage signal required for the normal pixel to display a L255 image is Vop. In the wide viewing angle display mode, the normal display pixel works, the display signal V is applied thereto, while the interference display pixel does not work, and no signal is applied thereto. Because the interference pixel region is black, the normal image M1 may be view at all viewing angles. In the anti-peeping display mode, the normal display pixel and the interference display pixel work at the same time. At this time, the normal display pixel is applied with the display signal V, the interference display pixel is applied with the driving signal Vop to display a white image (or other colors different from that of the normal image, excepting black). At the anti-peeping angle, the observer may only see the normal image M1 displayed by the normal display pixels. At other viewing angles, the observer may not only see the normal image M1 but also the white image M2 displayed by the interference display pixels, and the total image viewed is M1+M2. Because M2 is the interference image, it can be regarded as a noise signal or light leakage, which will seriously affect the contrast of the image view by the observer, so that the normal image M1 may not be completely displayed and the anti-peeping function is realized.

Figure 4:
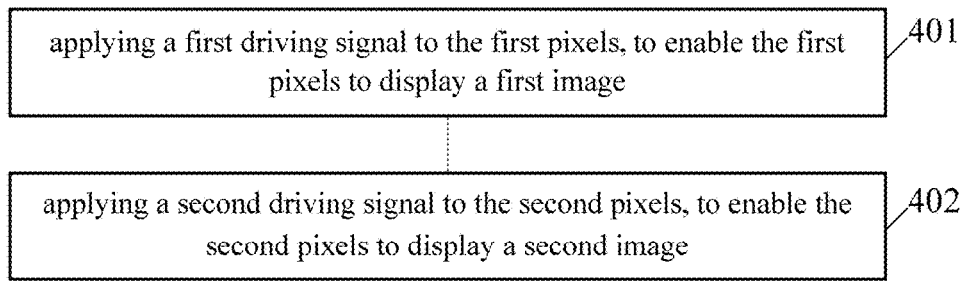
FIG. 4 is a flow chart of a display method in some embodiments of the present disclosure.

A display method of a display device is further provided in the present disclosure. As shown in FIG. 4, the method includes: Step 401: applying a first driving signal to the first pixels, to enable the first pixels to display a first image; Step 402: applying a second driving signal to the second pixels, to enable the second pixels to display a second image.

The display panel in some embodiments of the present disclosure is configured with two pixels of different display contents, so as to implement an anti-peeping display.

In some embodiments of the present disclosure, the first image displayed by the first pixels is served as a normal display image of the display panel, and the second image displayed by the second pixels interferes with the normal display image. The light-shielding patterns shield part of light beams emitted by the second pixels, so the region corresponding to the shielded angle is not interfered by the interference image, and the user may only see the normal display image in the display blind zone of the second pixels, so as to achieve the anti-peeping function.

In some embodiments of the present disclosure, the first image displayed by the first pixels and the second image displayed by the second pixels together forms the normal image, and the display blind zone of the second pixels which is shielded is not able to display the normal image completely, so the display blind zone become the anti-peeping region.

Figure 5:
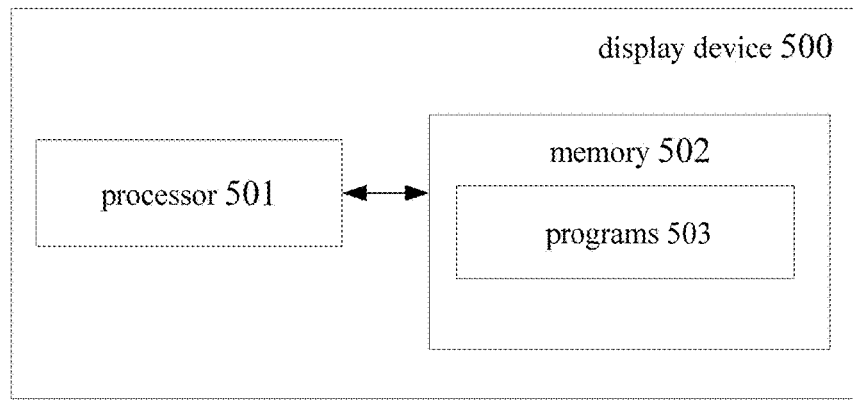
FIG. 5 is a schematic view of a display device in some embodiments of the present disclosure.

In addition, as shown in FIG. 5, a display device 500 is further provided in some embodiments of the present disclosure, including a processor 501, a memory 502 and programs 503 stored in the memory 502 and configured to be executed by the processor 501. The processor 501 executes the programs 503, so as to: apply a first driving signal to the first pixels A, to enable the first pixels A to display a first image; and apply a second driving signal to the second pixels B, to enable the second pixels B to display a second image.

Specifically, the processor 501 and the memory 502 are connected through a bus interface. The bus interface architecture may include any number of interconnected buses and bridges, specifically one or more processors represented by processor 501 and various circuits of memory represented by memory 502 linked together. The bus architecture can also link various other circuits such as peripherals, voltage regulators, power management circuits, and the like, which are well known in the art and therefore will not be further described herein. The bus interface provides the interface.

In some embodiments of the present disclosure, the first image is a normal image, and the second image is an interference image, or the first image and the second image together forms a normal image.

In addition, a computer-readable storage medium storing programs is further provided in some embodiments of the present disclosure. The programs are executed by the processor, so as to: apply a first driving signal to the first pixels A, to enable the first pixels A to display a first image; and apply a second driving signal to the second pixels B, to enable the second pixels B to display a second image.

In some embodiments of the present disclosure, the first image is a normal image, and the second image is an interference image, or the first image and the second image together forms a normal image.

The above are merely some embodiments of the present disclosure. A person skilled in the art may make further modifications and improvements without departing from the principle of the present disclosure, and these modifications and improvements shall also fall within the scope of the present disclosure.

It should also be noted that, in the present disclosure, relational terms such as first and second, etc. are only used to distinguish one entity or operation from another entity or operation, and do not necessarily require or imply these entities or operations. Moreover, the terms "include", "including" or any other variations thereof are intended to cover non-exclusive inclusions such that a process, method, article, or terminal device that includes a range of elements includes not only those elements but also includes unspecified columns. Other factors may also include elements inherent in such processes, methods, articles, or terminal equipment. In the case of no more limitation, the element defined by the sentence "include one . . . " does not exclude that other same elements exist in the process, the method, the article, or the terminal device including the element.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A display panel, comprising a plurality of pixels, wherein the pixels comprise:
   first pixels configured to display a first image; and
   second pixels configured to display a second image;
   wherein the display panel further comprises light-shielding patterns configured to shield part of light beams emitted by the second pixels, the light-shielding patterns comprise a first light-shielding sub pattern and a second light-shielding sub pattern arranged at different layers;
   the display panel further comprises an upper substrate, a lower substrate opposite to each other and a liquid crystal layer between the upper substrate and the lower substrate;
   the first light-shielding sub pattern is on one side of the upper substrate close to the liquid crystal layer, the second light-shielding sub pattern is on one side of the lower substrate close to the liquid crystal layer, and the liquid crystal layer is disposed between the first light-shielding sub pattern and the second light-shielding sub pattern; and
   orthographic projections of the light-shielding patterns to the lower substrate do not overlap with orthographic projections of the first pixels to the lower substrate.

2. The display panel according to claim 1, wherein the second light-shielding sub pattern comprises a slit, and an orthographic projection of the slit onto the first light-shielding sub pattern at least partially overlaps the first light-shielding sub pattern.

3. The display panel according to claim 2, wherein the orthographic projection of the slit onto the first light-shielding sub pattern is within the first light-shielding sub pattern.

4. The display panel according to claim 2, wherein a width of the first light-shielding sub pattern is: $b=a+2\times\tan\theta\times h$, wherein a is a width of the slit, h is a vertical interval between the first light-shielding sub pattern and the second light-shielding sub pattern, b is the width of the first light-shielding sub pattern, $\theta$ is an angle, wherein $\eta_1\times\sin\theta=\eta_2\times\sin\Phi$, $\Phi$ is a privacy angle, $\eta_1$ is a refractive index of a medium in a cell of the display panel, and $\eta_2$ is a refractive index of air.

5. The display panel according to claim 1, further comprising:
   a liquid crystal layer between the upper substrate and the lower substrate;
   an upper polarizer at a side of the upper substrate away from the lower substrate; and
   a lower polarizer at a side of the lower substrate away from the upper substrate;
   wherein an optical transmission axis of the upper polarizer is perpendicular to an optical transmission axis of the lower polarizer, and an initial orientation of liquid crystal molecules of the liquid crystal layer corresponding to the second pixels is parallel to the optical transmission axis of the upper polarizer.

6. The display panel according to claim 1, further comprising:
   a liquid crystal layer between the upper substrate and the lower substrate;
   an upper polarizer at a side of the upper substrate away from the lower substrate; and
   a lower polarizer at a side of the lower substrate away from the upper substrate;
   wherein an optical transmission axis of the upper polarizer is perpendicular to an optical transmission axis of the lower polarizer, and an initial orientation of liquid crystal molecules of the liquid crystal layer corresponding to the second pixels is parallel to the optical transmission axis of the lower polarizer.

7. The display panel according to claim 1, wherein the first pixels and the second pixels are arranged alternately.

8. A display device, comprising:
   the display panel according to claim 1,
   a first driver, configured to apply a first driving signal to the first pixels, to enable the first pixels to display a first image; and
   a second driver, configured to apply a second driving signal to the second pixels, to enable the second pixels to display a second image.

9. The display device according to claim 8, wherein the first image is a normal image, and the second image is an interference image.

10. The display device according to claim 8, wherein the first image and the second image together forms a normal image.

11. The display device according to claim 8, wherein the second light-shielding sub pattern comprises a slit, and an orthographic projection of the slit onto the first light-shielding sub pattern at least partially overlaps the first light-shielding sub pattern.

12. The display device according to claim 11, wherein the orthographic projection of the slit onto the first light-shielding sub pattern is within the first light-shielding sub pattern.

13. The display device according to claim 11, wherein a width of the first light-shielding sub pattern is: $b=a+2\times\tan\theta\times h$, wherein a is a width of the slit, h is a vertical interval between the first light-shielding sub pattern and the second light-shielding sub pattern, b is the width of the first light-shielding sub pattern, $\theta$ is an angle, wherein $\eta_1\times\sin\theta=\eta_2\times\sin\Phi$, $\Phi$ is a privacy angle, $\eta_1$ is a refractive index of a medium in a cell of the display panel, and $\eta_2$ is a refractive index of air.

14. A display method of a display device, wherein the display device comprises the display panel according to claim 1, the display method comprises:
applying a first driving signal to the first pixels, to enable the first pixels to display a first image;
applying a second driving signal to the second pixels, to enable the second pixels to display a second image.

15. The method according to claim 14, wherein the first image is a normal image, and the second image is an interference image.

16. The method according to claim 14, wherein the first image and the second image together forms a normal image.

17. The method according to claim 14, wherein the second light-shielding sub pattern comprises a slit, and an orthographic projection of the slit onto the first light-shielding sub pattern at least partially overlaps the first light-shielding sub pattern.

18. The method according to claim 17, wherein a width of the first light-shielding sub pattern is: $b=a+2\times\tan\theta\times h$, wherein a is a width of the slit, h is a vertical interval between the first light-shielding sub pattern and the second light-shielding sub pattern, b is the width of the first light-shielding sub pattern, $\theta$ is an angle, wherein $\eta_1\times\sin\theta=\eta_2\times\sin\Phi$, $\Phi$ is a privacy angle, $\eta_1$ is a refractive index of a medium in a cell of the display panel, and $\eta_2$ is a refractive index of air.

19. A display panel, comprising a plurality of pixels, wherein the pixels comprise:
first pixels configured to display a first image; and
second pixels configured to display a second image;
wherein the display panel further comprises light-shielding patterns configured to shield part of light beams emitted by the second pixels, the light-shielding patterns comprise a first light-shielding sub pattern and a second light-shielding sub pattern arranged at different layers along a direction perpendicular to a lower substrate;
the display panel further comprises an upper substrate, the lower substrate opposite to each other and a liquid crystal layer between the upper substrate and the lower substrate;
the first light-shielding sub pattern is on one side of the upper substrate close to the liquid crystal layer, and the second light-shielding sub pattern is on one side of the lower substrate close to the liquid crystal layer, the liquid crystal layer is disposed between the first light-shielding sub pattern and the second light-shielding sub pattern;
and orthographic projections of the light-shielding patterns to the lower substrate do not overlap with orthographic projections of the first pixels to the lower substrate.

20. A display panel, comprising a plurality of pixels, wherein the pixels comprise:
first pixels configured to display a first image; and
second pixels configured to display a second image;
wherein the display panel further comprises light-shielding patterns configured to shield part of light beams emitted by the second pixels, the light-shielding patterns comprise a first light-shielding sub pattern and a second light-shielding sub pattern arranged at different layers along a direction perpendicular to a lower substrate;
the display panel further comprises an upper substrate, the lower substrate opposite to each other and a liquid crystal layer between the upper substrate and the lower substrate;
the first light-shielding sub pattern is on one side of the upper substrate close to the liquid crystal layer, and the second light-shielding sub pattern is on one side of the lower substrate close to the liquid crystal layer, and the liquid crystal layer is disposed between the first light-shielding sub pattern and the second light-shielding sub pattern;
an orthographic projection of the first light-shielding sub pattern to the lower substrate is only within an orthographic projection of a second pixel to the lower substrate, and orthographic projections of the light-shielding patterns to the lower substrate do not overlap with orthographic projections of the first pixels to the lower substrate.

* * * * *